United States Patent
Holland et al.

(10) Patent No.: US 7,564,799 B2
(45) Date of Patent: Jul. 21, 2009

(54) SYSTEM AND METHOD FOR PROVIDING SEAMLESS ROAMING

(75) Inventors: Joshua Harold Holland, Linn, IA (US); Douglas Martin Greve, Iowa City, IA (US); Joe Gene Putnam, Cedar Rapids, IA (US)

(73) Assignee: Intermec IP Corp., Woodland Hills, CA (US)

(*) Notice: Subject to any disclaimer, the term of this patent is extended or adjusted under 35 U.S.C. 154(b) by 684 days.

(21) Appl. No.: 10/959,567

(22) Filed: Oct. 5, 2004

(65) Prior Publication Data

US 2005/0238047 A1    Oct. 27, 2005

Related U.S. Application Data

(60) Provisional application No. 60/565,027, filed on Apr. 23, 2004.

(51) Int. Cl.
*H04J 1/16* (2006.01)
(52) U.S. Cl. ........................... 370/252; 370/338
(58) Field of Classification Search ................. 370/229, 370/230, 235, 238, 241, 248, 249, 252, 254, 370/328, 338, 412
See application file for complete search history.

(56) References Cited

U.S. PATENT DOCUMENTS

| | | | |
|---|---|---|---|
| 6,434,159 B1* | 8/2002 | Woodward et al. | 370/401 |
| 2002/0006786 A1* | 1/2002 | Mine | 455/414 |
| 2002/0077897 A1* | 6/2002 | Zellner et al. | 705/14 |
| 2002/0122394 A1* | 9/2002 | Whitmore et al. | 370/328 |
| 2003/0013491 A1* | 1/2003 | Moriki | 455/564 |
| 2003/0061273 A1* | 3/2003 | Hayduk | 709/203 |
| 2003/0081579 A1* | 5/2003 | Tosey et al. | 370/338 |
| 2003/0083079 A1* | 5/2003 | Clark et al. | 455/466 |
| 2004/0083264 A1* | 4/2004 | Veselov | 709/204 |
| 2004/0174853 A1* | 9/2004 | Saito et al. | 370/338 |
| 2004/0179506 A1* | 9/2004 | Padovani et al. | 370/342 |
| 2005/0202825 A1* | 9/2005 | Puranik et al. | 455/450 |
| 2006/0126499 A1* | 6/2006 | Pathak et al. | 370/217 |
| 2006/0209753 A1* | 9/2006 | Patel | 370/329 |
| 2008/0062934 A1* | 3/2008 | Zhao | 370/332 |

* cited by examiner

*Primary Examiner*—Ricky Ngo
*Assistant Examiner*—Kan Yuen
(74) *Attorney, Agent, or Firm*—O'Melveny & Myers LLP (57) ABSTRACT

A communication system is provided in which a client device can communicate with a server via any one of plural communication networks, such as a WWAN, a WLAN, a wired LAN, a personal area network (e.g., Bluetooth), and any other networking architecture. More specifically, the communication client comprises a connection manager that is adapted to determine availability of each the plural communication networks to communicate data between the client and the server, select one of the communication networks from the available ones of the plural communication networks in accordance with predetermined preferences, and establish a connection with the selected one of the communication networks. The client may further comprise a client application. The connection manager provides a notification message to the client application upon establishment of the communication link. The client application then communicates data to and from the server via the selected one of the communication networks. In an alternative embodiment of the invention, the communication system further includes an intelligent queuing system, comprising a client-side queue on the communication client and a server-side queue on the server. The connection manager is further adapted to determine cost associated with communicating the data on available ones of the plural communication networks and provide that information to the client-side queue. The client-side queue determines whether to communicate the data via the selected one of the communication networks based in part on the determined cost.

15 Claims, 7 Drawing Sheets

SYSTEM AND METHOD FOR PROVIDING SEAMLESS ROAMING

CROSS-REFERENCE TO RELATED APPLICATION

This application claims priority pursuant to 35 U.S.C. § 119(e) of U.S. Provisional Application Ser. No. 60/565,027, filed Apr. 23, 2004.

BACKGROUND OF THE INVENTION

1. Field of the Invention

The present invention relates to portable communication systems, and more particularly, to a system and method for providing a seamless roaming solution to a portable client device to decrease communication cost and improve communication performance.

2. Description of Related Art

It is very advantageous to permit individual workstations, personal computers and other devices to communicate together over a network. The network enables each client node (i.e., individual computing device) to access data and other devices, such as laser printers. A local area network (LAN) is a group of computers and associated devices that share a common communications line or wireless link and typically share the resources of a single processor or server within a small geographic area (for example, within an office building). Usually, the server has applications and data storage that are shared in common by multiple computer users (i.e., clients). A local area network may serve as few as two or three clients (for example, in a home network) or as many as thousands of clients (for example, in an FDDI network). Ethernet is the most commonly used LAN technology, but other networking technologies such as Token Ring, FDDI, and ARCNET are also used in some applications.

There is a growing desire to have network clients be portable or to have a portable communication client that can operate beyond a defined environment. A portable communication client is particularly useful for remote data collection applications such as inventory control, manufacturing and production flow management, and asset tracking. For example, a mobile worker may move throughout a work area carrying the portable communication client and then send and receive inventory control, manufacturing and production flow management, and asset tracking status and updates to and from the server. The mobile worker may also exit the immediate work area and travel over a wide geographic area. It is very desirable that the mobile worker maintain network connectivity as it moves throughout the travel range.

To address this need for portability, many businesses have adopted wireless local area networks (WLANs) based on the IEEE 802.11 standard that allow mobile users to connect to their wired LAN via a wireless radio connection. To deploy a wireless network, client devices such as desktop computers, laptop computers and personal digital assistants are equipped with wireless network cards. A wireless access point connects to the regular wired office backbone and then communicates with wireless network cards installed in the client devices via radio signals, thereby connecting the two. A wireless wide area network (Wireless WAN or WWAN) covers a much more extensive area than WLANs. Coverage is generally offered on a metropolitan, national or even global level (IEEE 802.16, 802.20) with wireless network infrastructure provided by a wireless service carrier (for a monthly usage fee, similar to a cellular phone subscription). While WLANs are used to allow network users to be mobile within a small fixed area, WWANs can provide connectivity over a much broader coverage area, for mobile users such as business travelers or field service technicians. WWANs allow users to have access to the Internet, e-mail, and corporate applications and information while away from their office. WWANs use licensed and unlicensed frequencies for data and voice transmission.

Each of these types of networks has distinct advantages and disadvantages. Generally, WLAN services offer high-bandwidth connectivity but limited coverage, whereas WWAN service typically offers better coverage but lower bandwidth. There are cost differences as well between these networks, and it is usually less expensive to connect through a WLAN than through a WWAN. With the advent of public access 802.11 network areas, often called hotspots, it is desirable to leverage these available WWAN, WLAN and/or LAN resources to provide a faster, more efficient and lower cost method of connecting the client to its server.

Accordingly, it would be desirable to provide a system and method that enables a portable communication client to easily switch or roam from one type of communication network to another depending upon availability and/or cost.

SUMMARY OF THE INVENTION

The present invention addresses the shortcomings of the prior art systems and methods. In particular, the present invention is directed to a system and method for providing a seamless roaming solution to a portable client.

In a first embodiment of the invention, a communication system is provided in which a client device can communicate with a server via any one of plural communication networks, such as a WWAN, a WLAN, a wired LAN, a personal area network (e.g., Bluetooth), and any other networking architecture. More specifically, the communication client comprises a connection manager that is adapted to determine availability of each the plural communication networks to communicate data between the client and the server, select one of the communication networks from the available ones of the plural communication networks in accordance with predetermined preferences, and establish a communication link with the selected one of the communication networks. The client may further comprise a client application that establishes a connection with the server via the selected communication network. The client application may additionally provide a user interface. The predetermined preferences may further comprise a desired preference order among the plural communication networks.

In a second embodiment of the invention, the communication system further includes an intelligent queuing system, comprising a client-side queue on the communication client and a server-side queue on the server. Data is placed in the client-side or server-side queue prior to being communicated across the communication link. The client-side queue is further adapted to determine cost associated with communicating the data on available ones of the plural communication networks. The connection manager selects one of the communication networks based in part on the determined cost. When none of the communication networks is available to communicate the data between the client and the server, the data is temporarily stored in the client queue. The client application may be further adapted to assign a Time-to-Live (TTL) variable to the data when the date is placed into the client-side queue. The queuing system will delete the TTL assigned data when the TTL variable has expired.

A more complete understanding of the system and method for providing a seamless roaming solution to a portable client will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method that enables a portable communication client to easily switch or roam from one type of communication network to another depending upon availability and/or cost. More specifically, the present invention allows a portable communication client to seamlessly roam between any kind of network, including but not limited to wide area wireless, local area, wireless local area networks, personal area networks (e.g., Bluetooth), and the like, with little to no application or interaction from a user of the client. In an embodiment of the invention, a portable communication client can automatically switch from a wireless wide area network to one of a faster, lower cost network when it is available, then to automatically switch back to the wireless wide area network when the other network is no longer available. In the detailed description that follows, like element numerals are used to describe like elements illustrated in one or more figures.

Figure 1:
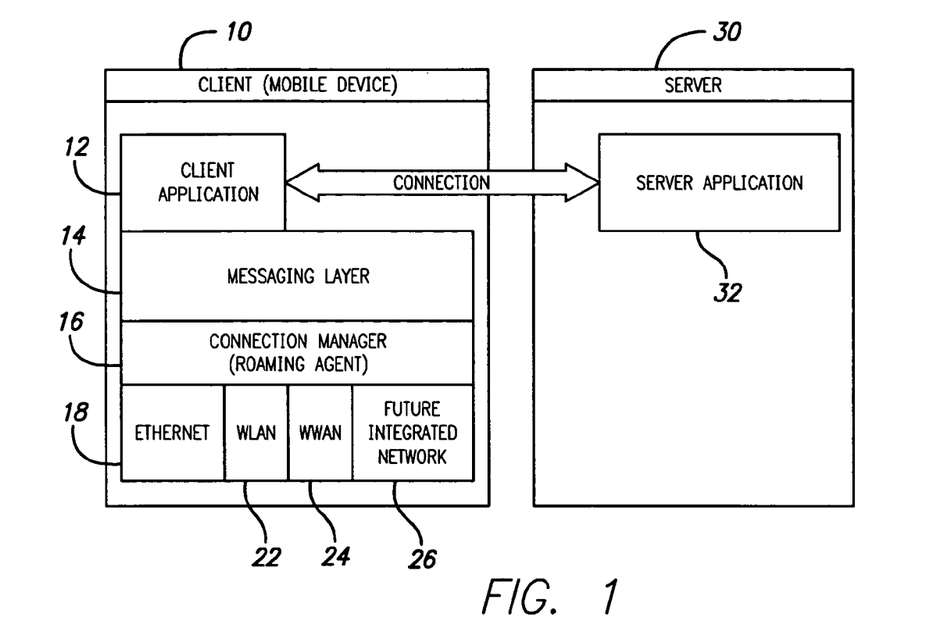
FIG. 1 is a block diagram illustrating a connection between a client and a server in accordance with a first embodiment of the invention.

Referring first to FIG. 1, a block diagram illustrates a connection between a client 10 and a server 30 in accordance with a first embodiment of the invention. The client 10 includes a client application 12 that provides the primary interface with the user. The client application 12 may comprise any general or special purpose software application running on the client 10, such as a web browser, e-mail client, word processor, database manager, contact manager, and the like. The client application 12 communicates with a corresponding server application 32 running on the server 30 through a connection established through a network. As will be further described below, a connection manager 16 running on the client 10 selects and establishes the network connection. Thereafter, the client application 12 establishes the connection with the server application 32 to enable it to receive information from and report information back to the server application. The nature of the connection between the client application 12 and the server application 32 may include any suitable technology for communicating bi-directional data across a network, such as but not limited to a socket connection, mailslots, named pipes, etc.

The connection manager 16 selects an appropriate network for communications between the client application 12 and the server application 32. The client 10 further includes a plurality of network adapters for each associated type of network that is available to the connection manager 16. As shown in FIG. 1, the exemplary client 10 includes network adapters for Ethernet 18, WLAN 22, WWAN 24, and an additional slot for a future network 26. The connection manager 16 communicates with the client application 12 through a messaging layer 14. The messaging layer 14 may be provided by a suitable middle-ware program, such as Windows Messaging and the like, that translates hardware interrupts received from various input devices into messages according to the current input context (e.g., the active window of the client application 12). Each message may be a short piece of information having a format that depends on its type. The messages are sent to the client application 12 using a suitable communication protocol (e.g., shared memory, internal socket, network socket, etc.). A messaging layer 14 operates below the client application 12, The connection manager 16 communicates with each of the network adapters to detect the presence of a suitable network connection and change the network connection as appropriate. The connection manager 16 then broadcasts a message to the client application 12 via the messaging layer 14. The client application 12 can then take appropriate action, such as establishing a socket connection with the server application 32 or changing the display presented to the user. Configuration information, such as enabling/disabling roaming to certain network types, can be sent through the messaging layer 14 to the connection manager 16 from a client application 12. The configuration may also be user-selected through a suitable interface that enables designation of desired preferences. The preferences define the order of priority among available networks that the connection manager 16 uses to select and establish a network connection. The preferences can also be set to not enable any connections (e.g., during low power functions) or to not enable certain connections when the user is in an area in which RF signals are restricted (such as in a hospital).

More specifically, the connection manager 16 monitors for the existence of available networks, and makes a determination to switch based on the predetermined preferences. Switching between networks is done seamlessly and/or automatically in near real-time. The connection manager 16 reports to the client application 12 when a network connection is made, when a connection is lost, or issues an error code in the event of an error. Depending upon the type of application, the client application 12 may or may not need and use the reported information from the connection manager 16.

In addition, the connection manager 16 can also be configured to use only a single network device or a combination of any, all, or none of the network devices available on the client 10. This configuration can be done on the fly, making it easy to automatically switch from one network type to another when a "better" network becomes available. For example, if a hotspot is detected and the 802.11 network adapter can connect to the access point, then the WWAN connection would be shut down until connectivity from the hotspot was lost, unless of course the device were placed into a dock and an Ethernet connection is discovered. The client 10 is also extensible, allowing it to integrate new networking technologies as they become available.

When the WWAN is in use by the client 10, the connection manager 16 periodically powers up the WLAN adapter and queries for network presence. If the presence of the network is detected, the WWAN connection is shut down and the connection manager 16 begins using the new connection. Once the connection is in use, the connection manager 16 continues to poll the current connection for network availability. If network availability is lost, the connection manager 16 then establishes a connection to the first available network in order of the above described preferences. In the event that no networks are present, the connection manager 16 continues to search periodically until a network is found, and then connects to that network.

The connection manager 16 also can be configured to automatically check for the presence of Ethernet when the unit is placed into a dock. The LAN adapter is powered up only when the client 10 is on external power, because Ethernet would only be available when the device is in the dock. As described below with respect to FIG. 7, if the check for Ethernet fails, a flag is set to not check for Ethernet again until a change in the external power state occurs. That way, if the client 10 is in a powered dock without Ethernet (such as a vehicle dock or a WLAN docking environment), the device does not continuously attempt to connect to a network that is unlikely to be present. Thus, in a preferred embodiment of the invention, the client 10 periodically checks for the availability of other networks based on both its configuration and the roaming algorithm, which takes into account battery life, external power status, and likelihood of network availability.

When the network connections are switched by the connection manager 16, the client application 12 has to reestablish its connection to the server application 32. The client application 12 is notified by the connection manager 16 when a connection has changed so that the client application can automatically (or manually) reestablish its connection with the server application 32. For example, if the client application 12 is an Internet browser application such as Internet Explorer™, the user would simply hit the refresh button to cause the application to reestablish a TCP connection with the http server and thereby download the information again.

Due to the network polling by the connection manager, it should be appreciated that the battery life of the client 10 may be diminished. Thus, the client 10 or a user of the client should be able to configure the frequency of the polling to optimize the power consumption. More frequent polling allows faster detection and connection to available networks, but consumes more power. Less frequent polling might cause opportunities of connecting to faster, low cost networks to be missed, but would conserve more battery life.

Figure 3:
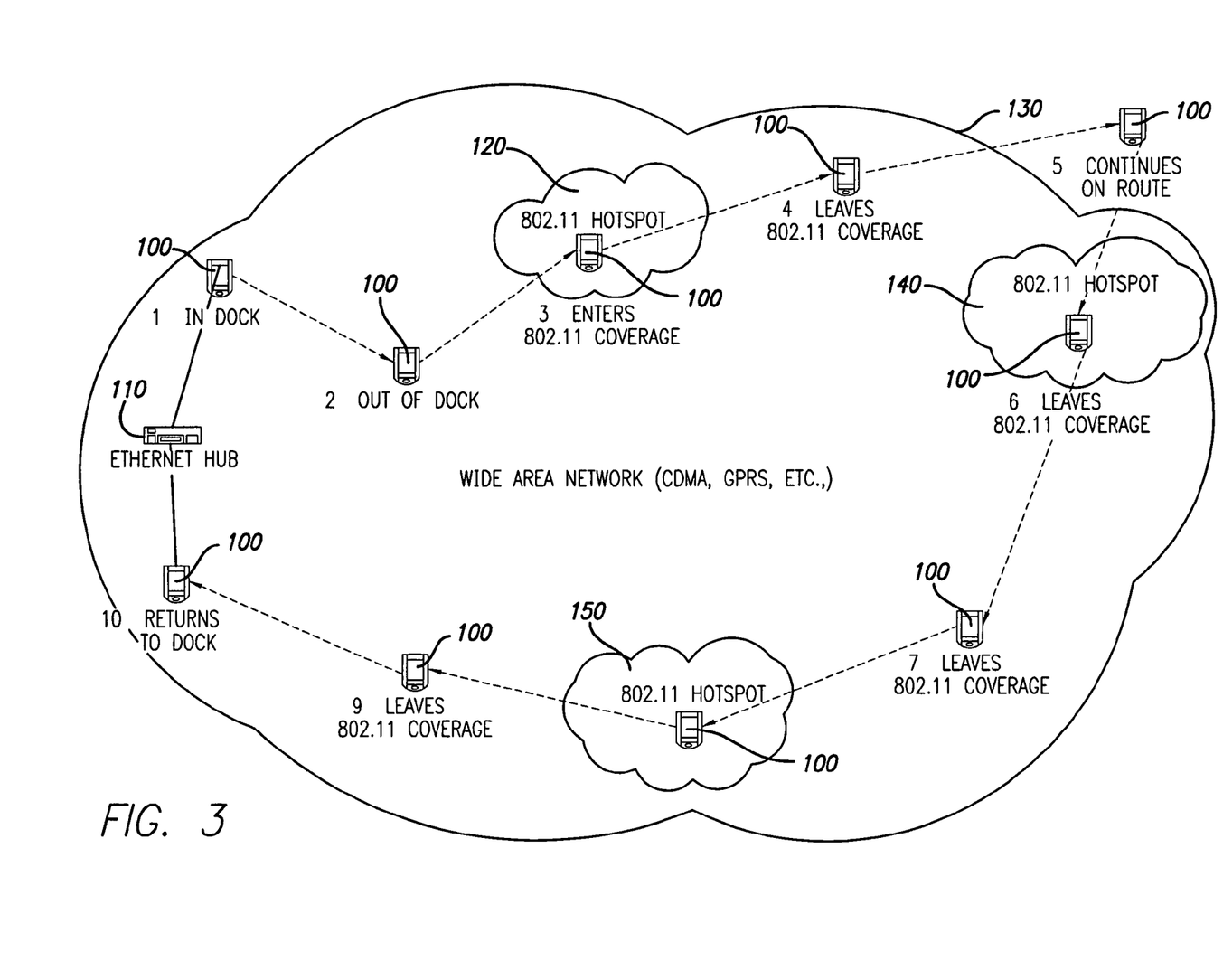
FIG. 3 is a schematic diagram illustrating operation of an exemplary client-server communication network enabling seamless roaming.

Referring now to FIG. 3, a typical day of operations using the above described client and connection manager begins with a portable client 100 docked in an Ethernet hub 110 and connected to a server over a LAN. The client 100 is then removed from the docking hub 110 and the connection manager automatically switches to a WWAN adapter and connects to an available WWAN. When the client 100 enters a WLAN (e.g., IEEE 802.11) hotspot 120, the client 100 automatically switches to a WLAN device driver and connects to the WLAN. When the client 100 leaves the hotspot coverage 120, it automatically switches back to the WWAN driver. When the client 100 leaves all network coverage 130, it stops communicating with the server. When the client 100 enters another hotspot 140, it automatically switches to the WLAN driver. When the client 100 leaves the hotspot 140, it automatically switches back to the WWAN adapter. When the client 100 enters yet another hotspot 150, it automatically switches to the WLAN driver. When the client 100 leaves the hotspot 150, it switches back to the WWAN driver. When the client 100 is returned back to the docking hub 110, an Ethernet driver is automatically loaded by the connection manager.

Those skilled in the art will appreciate that throughout the areas traveled by the client 100, the connection manager 16 has maintained a connection to the network whenever possible over various network connections, switching automatically without interference or prompting by the client application 12. It should be appreciated that the above-described mechanisms and implementations for seamless roaming are for exemplary purposes only and that the invention is not limited thereby.

Referring now to FIGS. 4 through 8, exemplary methods for implementing the seamless roaming solution for a portable client are shown. The following methods also include certain power management functions that may be utilized in certain applications. If power management is not a concern, then the steps in FIGS. 4 through 8 in which the network adapters of the portable client are powered up/down are not necessary and circumventing them would facilitate faster switching between networks.

Figure 4:
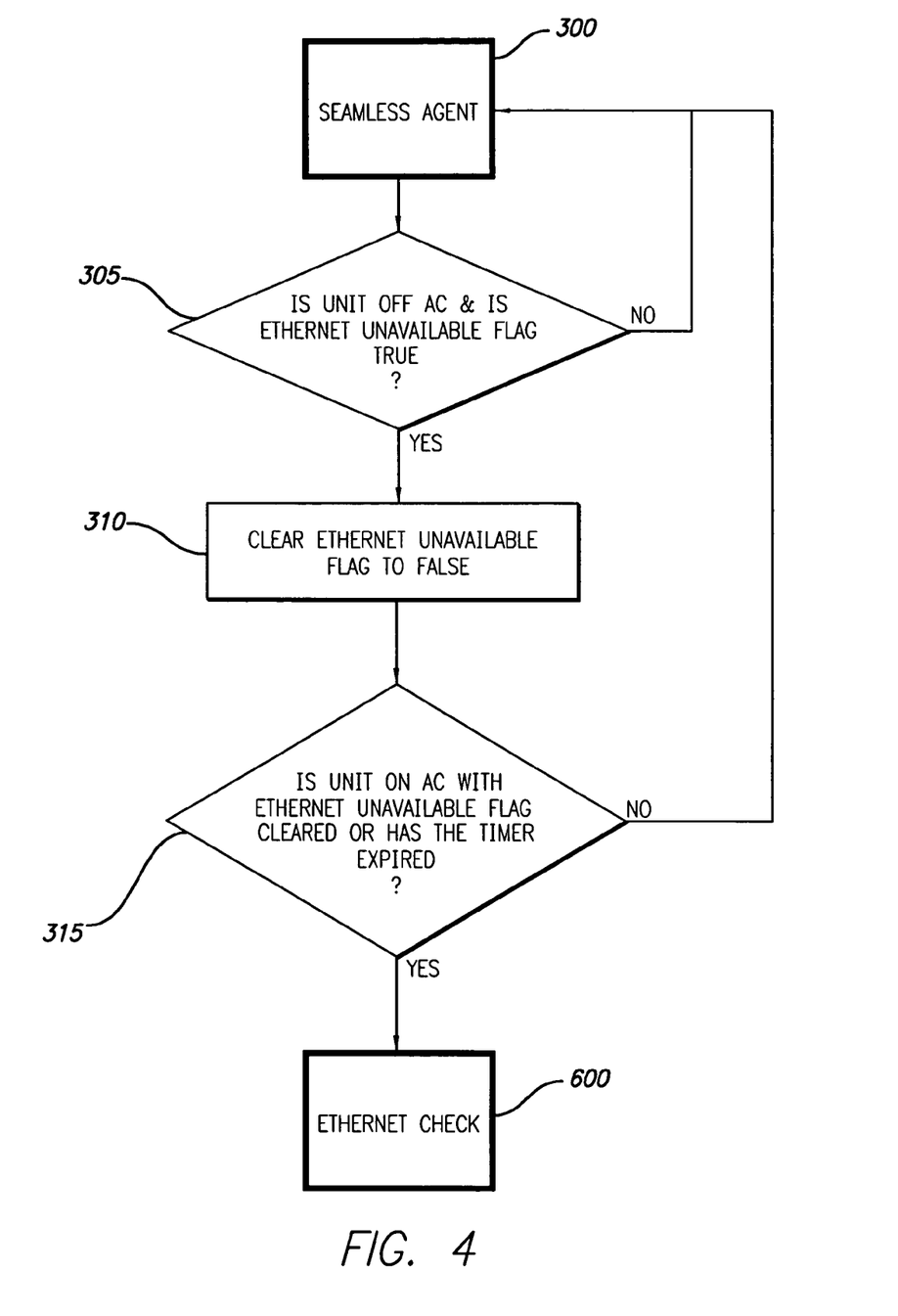
FIG. 4 is a flow diagram showing a method for determining if a portable client is attached to an Ethernet hub.

Referring now to FIG. 4, an exemplary method is presented for determining whether the client is plugged into a docking station and communicating with the LAN. At step 305, the method determines if the portable client is running on alternating current (AC), because Ethernet would only be available when the device is set in the dock. It should be appreciated that the device would be running on battery power when not in the dock. If the client is not running on AC and the Ethernet flag indicates that Ethernet is unavailable, the method clears the flag to indicate that Ethernet may be available at step 310. At step 315, the method then determines if the client is on AC power and if the flag has been cleared. If the client is on AC and if the flag has been cleared, the method moves to block 600 to perform an Ethernet check.

Figure 5:
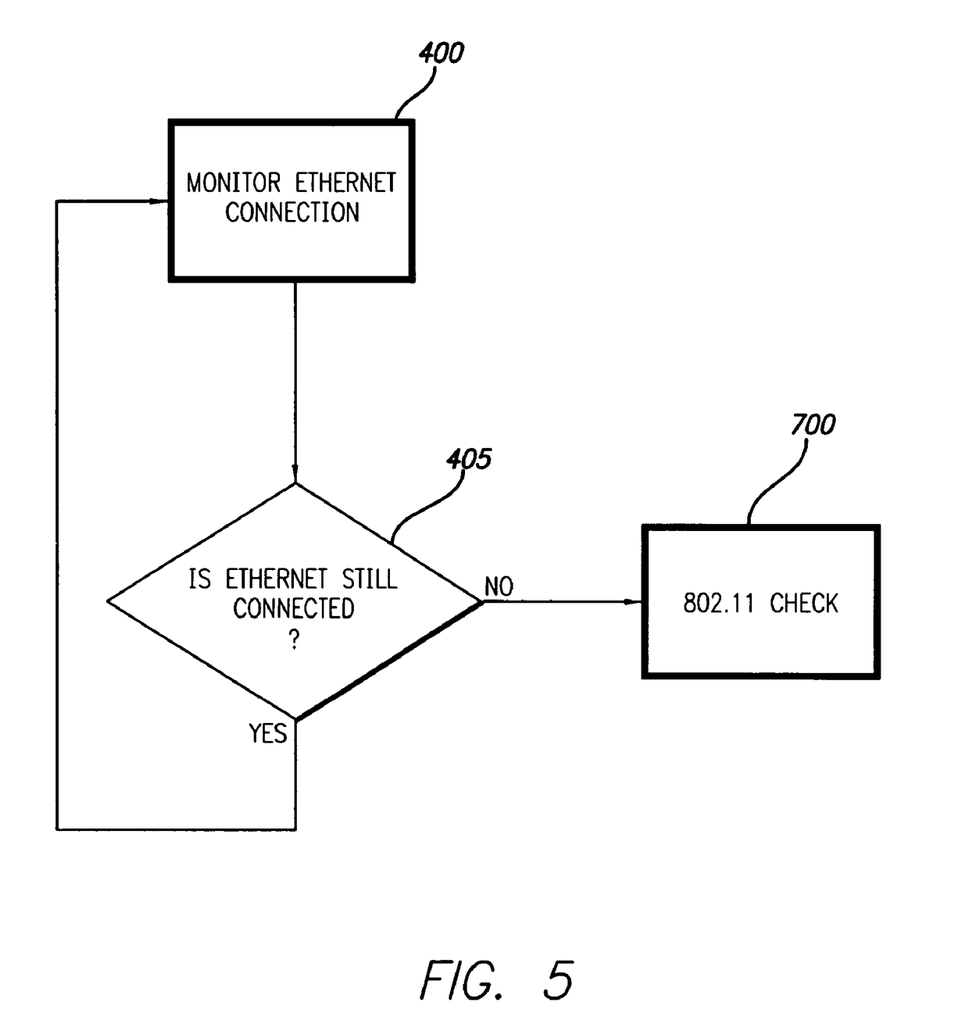
FIG. 5 is a flow diagram showing a method for monitoring the status of an Ethernet connection.

Referring now to FIG. 5, an exemplary method is presented for determining whether an Ethernet connection is available. At step 405, the method determines if the portable client is still connected to Ethernet. If the portable client is not connected to Ethernet, the method moves to block 700 to check for a WLAN (e.g., 802.11).

Figure 6:
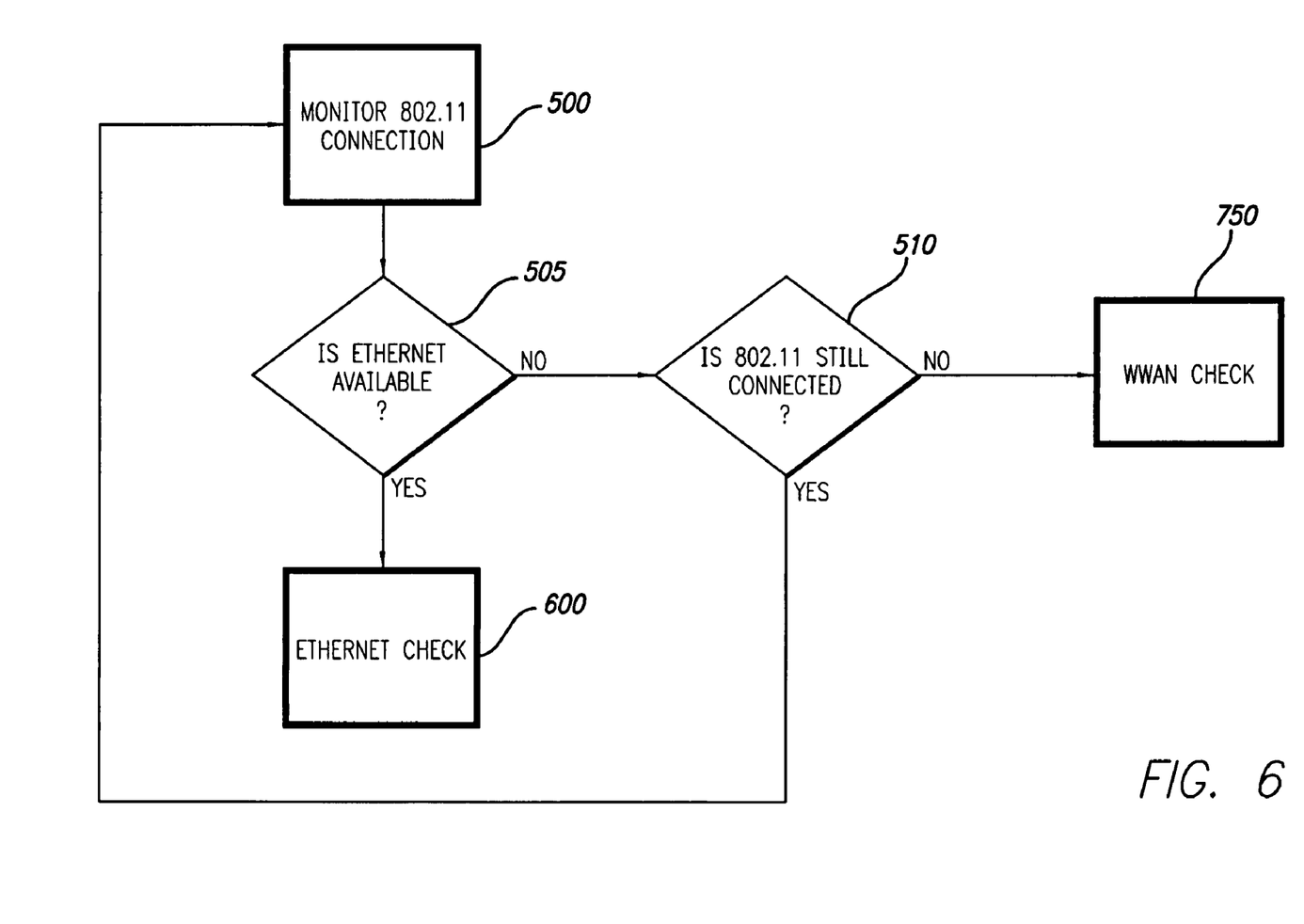
FIG. 6 is a flow diagram showing a method for monitoring the status of a WLAN connection.

Referring now to FIG. 6, an exemplary method is presented for determining whether a WLAN connection is available. At step 505, the method determines if an Ethernet connection is available. If the Ethernet connection is available, the method moves to block 600 to perform an Ethernet check. If the Ethernet connection is not available, the method moves to step 510 to check if the portable client is still connected to the WLAN. If the portable client is not connected to the WLAN, the method moves to block 750 to check for a WWAN.

Figure 7:
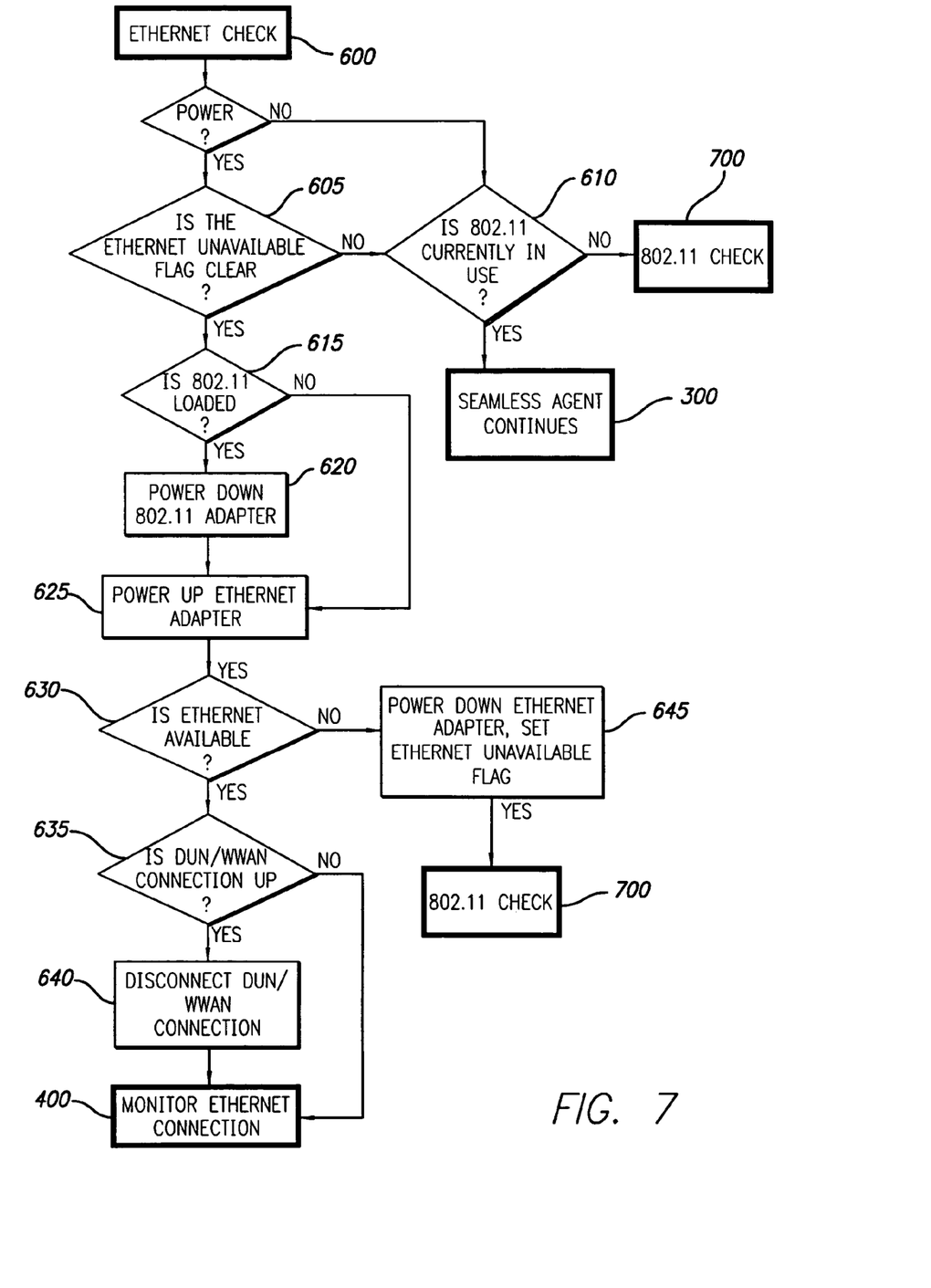
FIG. 7 is a flow diagram showing a method for switching between networks based on availability.

Referring now to FIG. 7, an exemplary method is presented for determining whether a WWAN connection is available. At step 605, the method determines if a flag indicating that Ethernet is unavailable has been cleared. If the flag has not been cleared, the method moves to step 610 to determine if a WLAN is currently being used. If the WLAN is not currently being used, the method moves to the WLAN check block 700. If the WLAN is currently being used, the method moves to the seamless agent block at 300. If the flag has been cleared, the method moves to step 615 to determine if a WLAN connection has been loaded. If the WLAN has been loaded, the method powers down a WLAN adapter at step 620. The method then moves to step 625 to power up an Ethernet adapter. The method then checks if Ethernet is available at step 630. If Ethernet is available, the method moves to step 635 to check if a WWAN connection is up. If the WWAN connection is up, the method moves to step 640 to disconnect the WWAN connection and then moves to the monitor Ethernet connection block 400. If Ethernet is not available, the method moves to step 645 to power down the Ethernet adapter and to set the Ethernet flag to indicate that Ethernet is unavailable and then moves to the WLAN check block 700.

Figure 8:
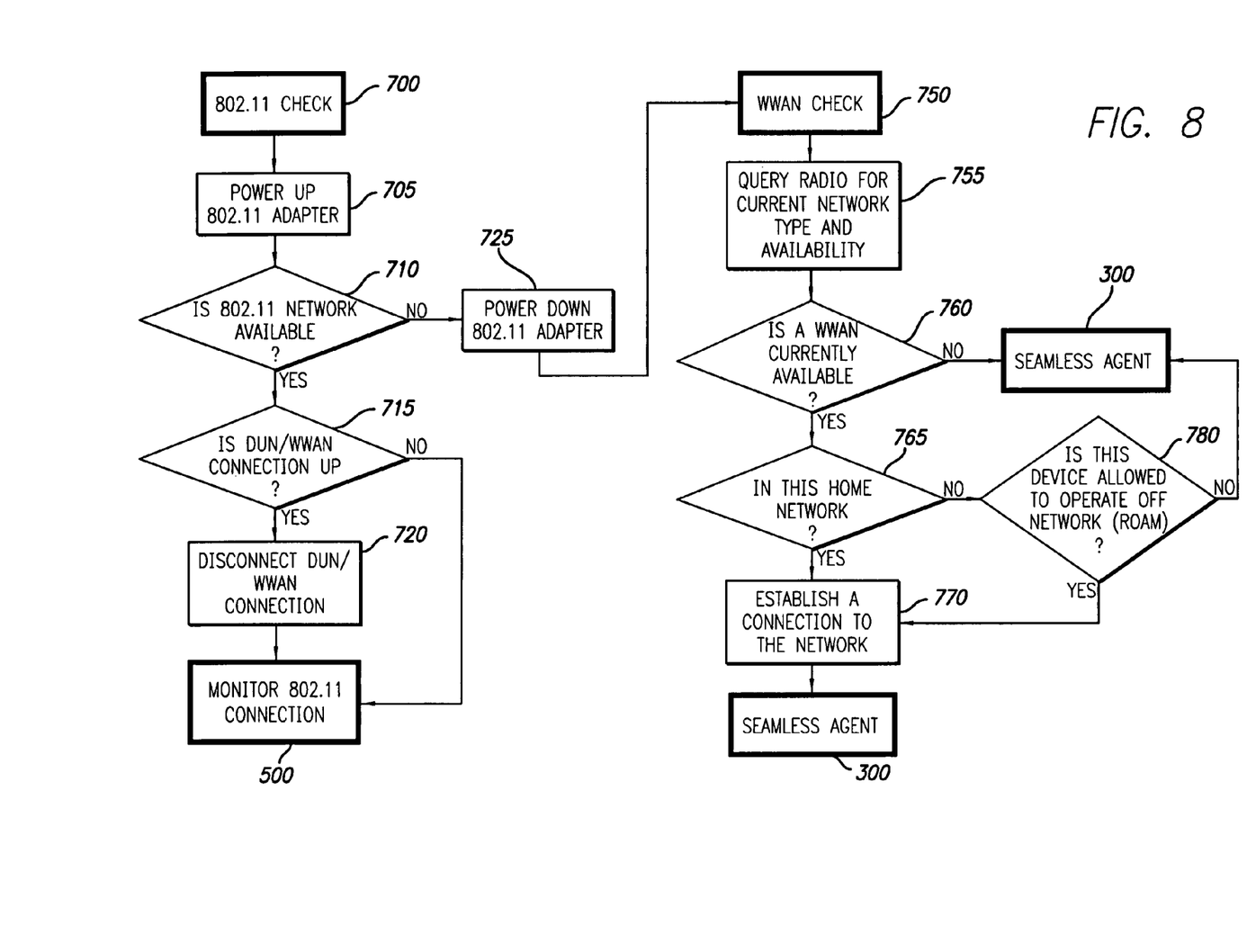
FIG. 8 is a flow diagram showing a method for monitoring the status of a WWAN connection.

Referring now to FIG. 8, an exemplary method is presented for switching between WLAN and WWAN connections. At step 705, the method powers up an WLAN adapter. At step 710, the method determines if a WLAN (e.g., a 802.11 network) is available. If the WLAN is available, the method moves to step 715 to check if a WWAN connection is up. If the WWAN connection is up, the method moves to step 720 to disconnect the WWAN connection and then moves to the monitor WLAN connection block 500. If the WLAN is not available, the method moves to step 725 to power down the WLAN adapter and then moves to the WWAN check block 750. The method then moves to step 755 to query a radio signal for a WWAN type and availability. At step 760, the method determines if a WWAN or WLAN is available for connection. If the WWAN is available, the method moves to step 765 to check if the WWAN is a home network. If the WWAN is the home network, the method moves to step 770 to connect to the WWAN and then moves to the seamless agent block 300. If the WWAN is not the home network, the method moves to step 780 to determine if the portable client is allowed to operate outside of its home network. If the client can operate outside of its home network, the method moves to step 770; if not, the method moves to the seamless agent block at 300.

Figure 2:
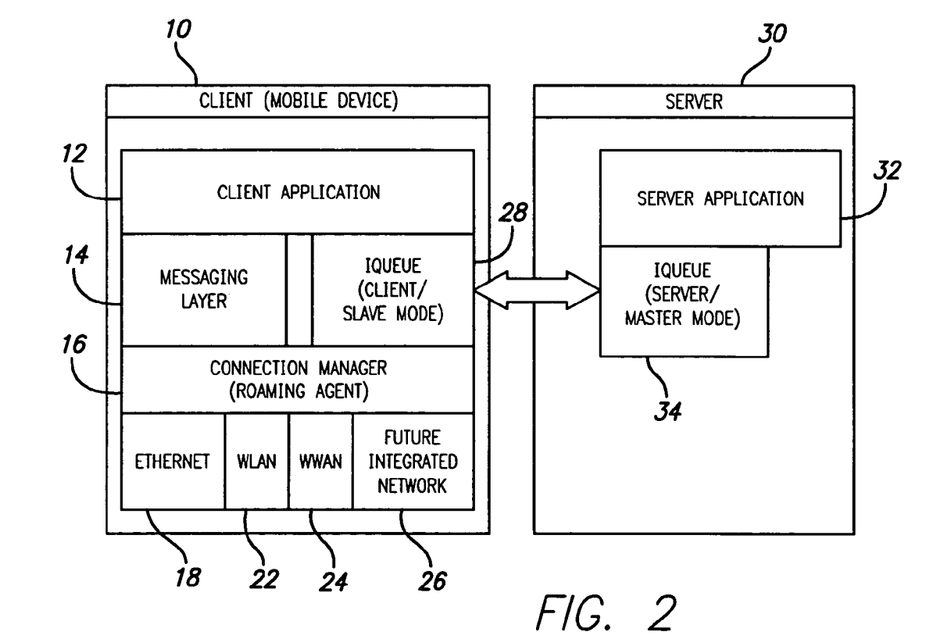
FIG. 2 is a block diagram illustrating a connection between a client and a server in accordance with a second embodiment of the invention.

In an alternative embodiment of the invention, the portable communication client further comprises an intelligent queuing system (or IQueue). The queuing system includes a client-side queue (i.e., client/slave mode) and a server-side queue (i.e., server/master mode). The server-side queue may be communicating with multiple client-side queues. Referring now to FIG. 2, a block diagram illustrates a connection between a client 10 and a server 30 in accordance with the alternative embodiment of the invention. In addition to the architecture described above with respect to FIG. 1, the client 10 includes client-side queue 28 and the server 30 includes server-side queue 34. Communications between the client 10 and server 30 pass through the queuing system. The connection manager 16 notifies the client-side queue 28 when a network connection is available (or lost) and the cost associated with that connection. The client-side queue 28 will then establish a connection to the server-side queue 34 through the selected network. Upon the establishment of the initial connection, the queues exchange various information including connection cost data. If the connection manager 16 determines that there is a network connection available, data is transferred between the queues and passed on to the destination application (i.e., client application 12 or server application 32). If there is no network connection available, or the cost of the connection exceeds the value of the data, the data is queued until a network connection of the appropriate cost becomes available.

The intelligent queuing system acts as a data router between client and server software applications. In particular, the client-side queue 28 is notified of the cost of the connection by the connection manager 16. The cost of a connection can be thought of literally as how much money will it cost to move data over a given network. Typically, the higher the real-time significance of the data, the higher the relative cost assigned by the client application 12 to the data sent to the client-side queue 28. The client-side queue 28 looks for the least costly route regardless of the cost associated with the data.

The intelligent queuing system enables client and server applications to communicate with other applications over a network via a series of data files stored in queues while awaiting delivery. Data delivery is asynchronous. Data files are guaranteed to be in First-In-First-Out (FIFO) order within their cost and priority levels. That is, the sender places data into its corresponding (client or server) queue. The receiver then reads the data from its local queue. That local queue may be the same queue to which the sender is attached or may be another queue in the system. Since data flows through the intelligent queuing system, data can be sent even when an intended receiver is off-line. Once a path is established to the receiver, the data is automatically sent if not already expired. Data queuing provides asynchronous communication services. Since a queue is used to store data, the data is delivered when the receiver is ready. Data queues may also be linked across multiple platforms within the network providing end-to-end delivery of data without the application knowing exactly what method is being used for the delivery. The intelligent queuing system also logs the successes and failures of attempted tasks.

The client application 12 can also assign a Time-to-Live (TTL) variable to the data. The data is stored until it is successfully sent, or until the TTL variable expires. If the TTL variable is exceeded, the intelligent queue deletes the data from its store-and-forward table. The intelligent queuing system can further provide queued data with an optional setting to send a positive or negative acknowledgement (ACK or NAK) back to the sender when it has been received or the TTL variable expires.

In addition, when using a WWAN, the connection manager 12 should be able to detect whether the client 10 is on its home network or roaming on another network. This is beneficial because users may be charged higher fees when not on their home network. In this event, the user may choose not to send data over the WWAN when not on the home network, or not connect to a network other than the home network. This setting may be designated in the preferences.

It should be appreciated that the number of data files that can queue up for later transmission is limited only by the amount of physical storage capacity on the unit. The sender can specify in seconds the amount of time to wait for delivery of a data file to take place before the TTL expires. If the data cannot be delivered in the allocated time, a NAK is returned to the sender if specified and the data is removed from the intelligent queuing system. The intelligent queuing system compares the cost of the data to the cost of the current network connection to determine whether or not the data should be transferred over the current network connection. Costing is per data, so a user can specify a different cost for each quantity of data without opening another link to the intelligent queuing system. The intelligent queuing system can also be used to prioritize the status of the data to raise or lower it within the intelligent queue. High priority data always jumps to the top of the list; low priority moves the data lower in the same list. Priority is set on the data as it is sent to the intelligent queue, allowing an application to send data at different priority levels without opening another link to the intelligent queuing system.

In the present alternative embodiment, the queuing system in conjunction with connection manager 16 acts as a session layer of the connection between the client 10 to the server 30 via the given network. Most data is stored in the client- or server-side queue if no network is present; except that some data can be sent with a flag to send without storing in the queue, in which case if the destination is not available the sender may receive a NAK, if requested. If a high cost network is the only network available, the lower cost data is queued until a lower cost network is available. In this embodiment, data meeting the cost of the current network are still forwarded. Priority has no influence in determining which connection is to be used. This costing system allows customers to save money by transferring only data of higher importance over the more expensive networks while holding or queuing data of lower importance until a less expensive network becomes available.

Unlike the first embodiment, when the connection manager 16 switches networks in this alternative embodiment, the connection manager notifies the client-side queue 24 that a new connection is available as well as the cost of the connection. The client-side queue 24 then immediately attempts to connect to the server-side queue 34. When the client-side queue is connected to the server-side queue, routing information including the cost associated with the current network connection can be exchanged, data can be forwarded, and then a route can be opened for near real-time communications. For example, in the present embodiment, once connected, all data that meets the cost of the connection are then transferred between the client queue and the server queue in near real-time.

Having thus described embodiments of a system and method for a seamless roaming solution for a portable client, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

The invention claimed is:

1. A communication system for use with plural communication networks, the communication system comprising:
 a server;
 at least one portable communication client adapted to communicate with said server via said communication networks, said communication client comprising a client queue, a client application and a connection manager, said connection manager being adapted to:
  determine availability of each of said plural communication networks to communicate data between said communication client and said server;
  select one of said communication networks from available ones of said plural communication networks in accordance with predetermined preferences, wherein said predetermined preferences further comprise power usage data associated with each of said plural communication networks, said connection manager excluding certain ones of said plural communication networks from consideration during low power conditions of said communication client based on said power usage data;
  establish a connection with said selected one of said communication networks, wherein said data is temporarily stored in said client queue and a Time-to-Life variable is assigned to said data when none of said communication networks are available to communicate said data between said communication client and said server; and
  provide a message to said client application upon establishment of said connection with said selected one of said communication network;
  wherein said data is placed in said queue prior to being communicated to said server.

2. The communication system of claim 1, wherein said client application establishes a communication link with said server via said selected one of said communication networks.

3. The communication system of claim 1, wherein said predetermined preferences further comprise a desired preference order among said plural communication networks.

4. The communication system of claim 1, wherein said connection manager is further adapted to determine cost associated with communicating said data on said available ones of said plural communication networks, and informs said client queue of said determined cost.

5. The communication system of claim 4, wherein said client queue determines whether to communicate said data based in part on consideration of said determined cost.

6. The communication system of claim 1, wherein said server further comprises a server queue in communication with said client queue via said communication link.

7. The communication system of claim 1, wherein said communication client further comprises plural network adapters associated with respective ones of said plural communication networks, and wherein said connection manager determines availability of said communication networks by periodically powering on said network adapters to poll said communication networks.

8. The communication system of claim 1, wherein said client queue is adapted to delete said TTL assigned data when said TTL variable has expired.

9. The communication system of claim 8, wherein said client queue is further adapted to:
 send said queued data to said server via said selected one of said communication networks if said TTL variable has not expired; and
 remove said data from said client queue after said data has been sent to said server.

10. The communication system of claim 1, wherein said plural communication networks comprise at least one of a wired local area network (LAN), a wireless local area network (WLAN), and a wireless wide area network (WWAN).

11. In a communication system including a server and a plurality of communication networks, at least one communication client adapted to communicate with said server via said communication networks, the at least one communication client having a client queue, a client application and a connection manager, said connection manager being adapted to perform the functions of:
 determining availability of each of said plural communication networks to communicate data between said communication client and said server;
 determining cost associated with communicating said data on said available ones of said plural communication networks;
 informing said client queue of said determined cost;
 selecting one of said communication networks from available ones of said plural communication networks in accordance with predetermined preferences, wherein said predetermined preferences comprise at least power usage data associated with each of said plural communication networks, said connection manager excluding certain ones of said plural communication networks from consideration during low rower conditions of said communication client based on said power usage data;
 establishing a connection with said selected one of said communication networks, wherein said data is temporarily stored in said client queue and a Time-to-Life variable is assigned to said data when none of said communication networks are available to communicate said data between said communication client and said server; and
 provide a message to said client application upon establishment of said communication link;

wherein said client application establishes a communication link with said server via said selected one said communication networks and said client queue determines whether to communicate said data based in part on consideration of said determined cost.

12. The communication client of claim 11, wherein said predetermined preferences further comprise a desired preference order among said plural communication networks.

13. The communication client of claim 11, further comprising plural network adapters associated with respective ones of said plural communication networks, and wherein said connection manager determines availability of said communication networks by periodically powering on said network adapters to poll said communication networks.

14. The communication client of claim 11, wherein said client queue is further adapted to delete said TTL assigned data when said TTL variable has expired.

15. The communication client of claim 14, wherein said client queue is further adapted to:
   send said queued data to said server via said selected one of said communication networks if said TTL variable has not expired; and
   remove said data from said client queue after said data has been sent to said server.

* * * * *